United States Patent [19]

Donham et al.

[11] 4,297,076

[45] Oct. 27, 1981

[54] WIND TURBINE

[75] Inventors: Robert E. Donham, Sherman Oaks; Richard L. Heimbold, Glendale, both of Calif.

[73] Assignee: Lockheed Corporation, Burbank, Calif.

[21] Appl. No.: 46,771

[22] Filed: Jun. 8, 1979

[51] Int. Cl.³ .............................................. F03D 7/04
[52] U.S. Cl. ...................................... 416/37; 416/41; 416/24
[58] Field of Search ............... 416/37, 41, 23, 24, 416/DIG. 7

[56] References Cited

U.S. PATENT DOCUMENTS

| | | | |
|---|---|---|---|
| 2,037,528 | 4/1936 | Miller | 416/23 |
| 2,152,984 | 4/1939 | Wilford | 416/DIG. 7 |
| 2,622,686 | 12/1952 | Chevreau et al. | 416/41 X |
| 2,865,459 | 12/1958 | Perdue | 416/37 |
| 3,589,831 | 6/1971 | Lemnios et al. | 416/24 |
| 3,874,816 | 4/1975 | Sweeney et al. | 416/41 X |
| 3,902,072 | 8/1975 | Quinn | 416/41 X |
| 4,084,921 | 4/1978 | Norz | 416/98 X |
| 4,160,170 | 7/1979 | Harner et al. | 416/48 X |
| 4,180,372 | 12/1979 | Lippert | 416/23 |
| 4,201,514 | 5/1980 | Huetter | 416/37 |

FOREIGN PATENT DOCUMENTS

| | | | |
|---|---|---|---|
| 917540 | 9/1954 | Fed. Rep. of Germany | 416/23 |
| 704045 | 5/1931 | France | 416/23 |
| 968411 | 11/1950 | France | 416/23 |

OTHER PUBLICATIONS

Machine Design, vol. 48, No. 12, May 20, 1976, pp. 18–20, 23–26.

*Primary Examiner*—Everette A. Powell, Jr.
*Attorney, Agent, or Firm*—Frederic P. Smith

[57] ABSTRACT

An improved wind turbine in which the tip portions of the blades are variable in pitch and are cyclically varied in pitch to control the yaw of the rotor and to relieve bending moments on the blades and are collectively varied in pitch to relieve bending moments on the blades and to maximize the power output of the turbine at a selected constant rotor speed.

13 Claims, 5 Drawing Figures

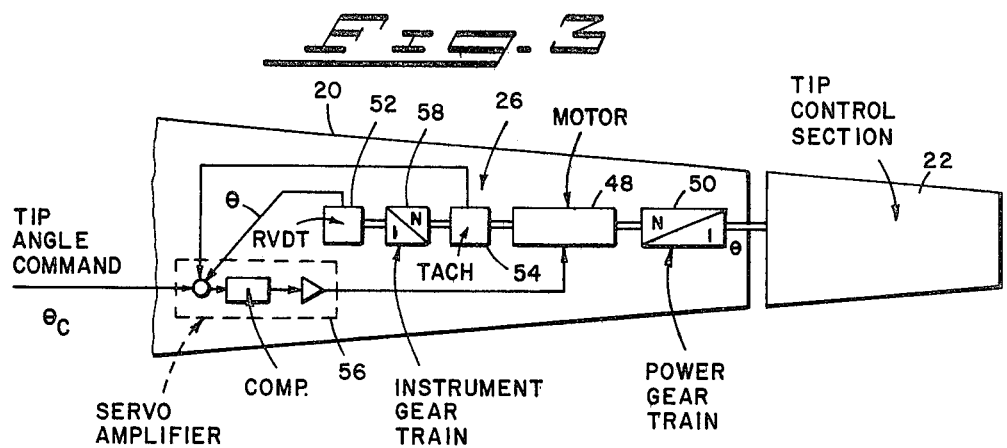
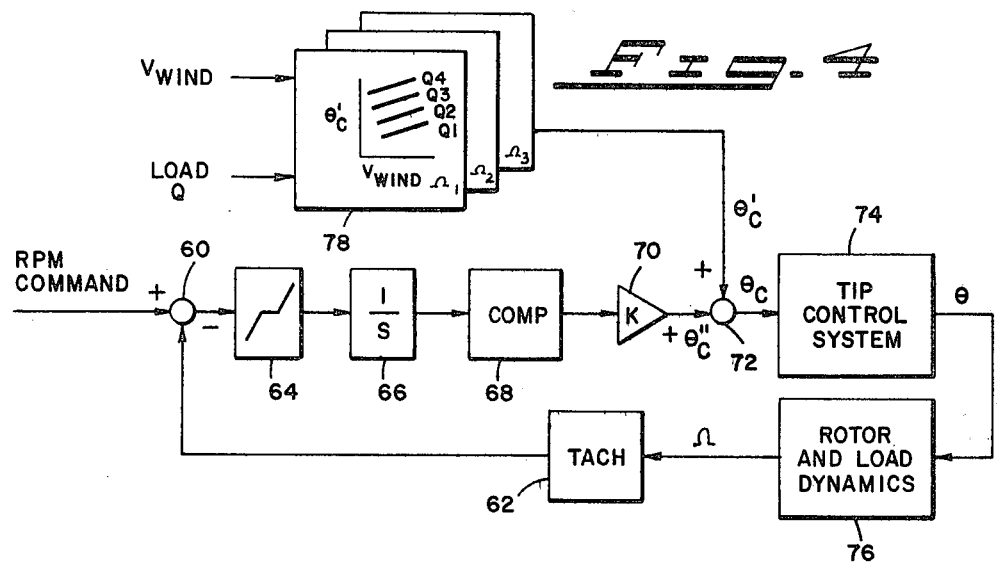

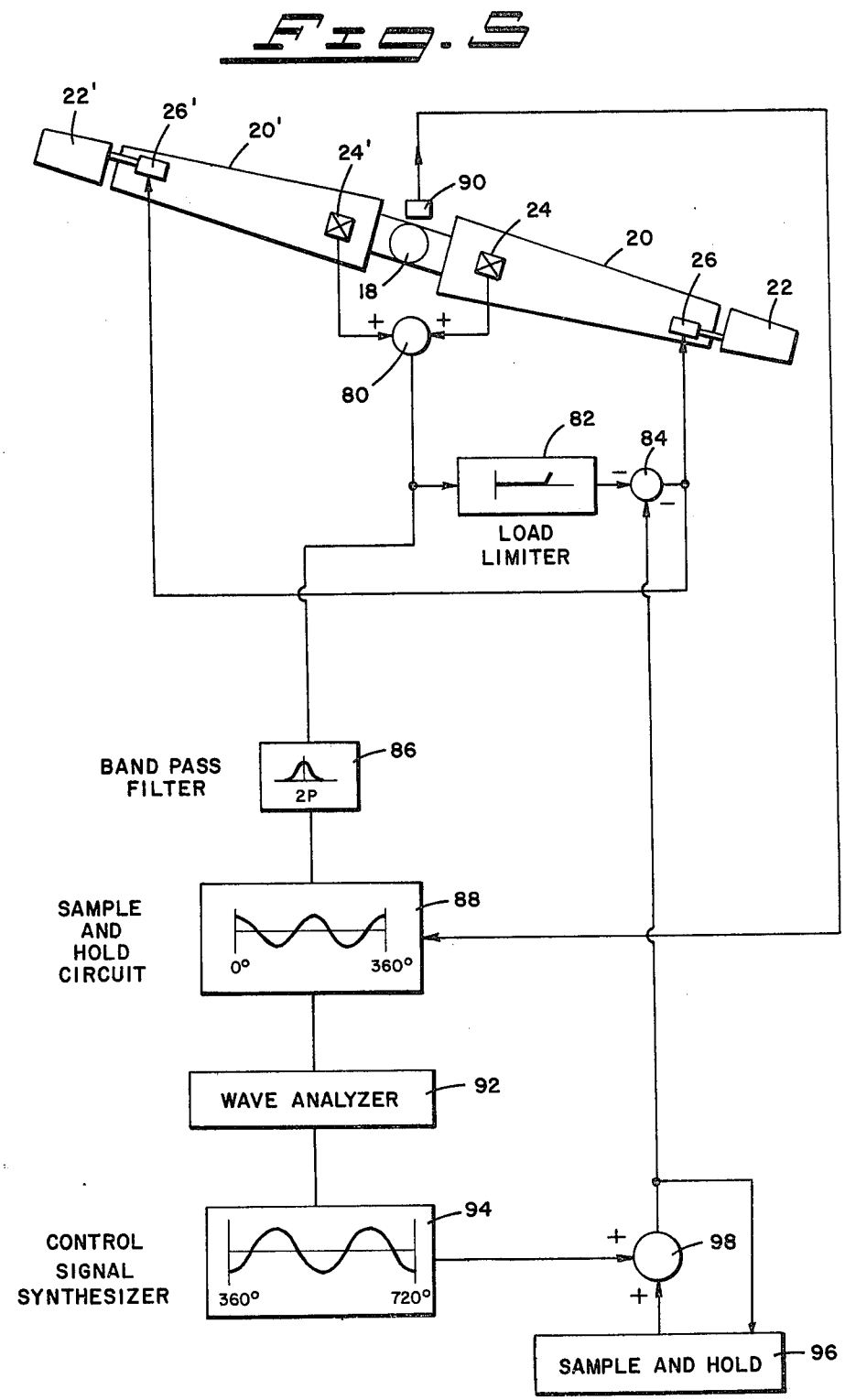

WIND TURBINE

TECHNICAL FIELD

The invention relates to the field of power generation devices and, in particular, to wind turbines.

BACKGROUND OF PRIOR ART

Windmills have been used for centuries to convert wind energy into mechanical energy. More recently wind energy has also been converted into electrical energy by windmills, generally referred to as wind turbines. While systems have been operating in several countries, in general wind energy has not played to date a significant role in meeting energy needs. With the recent energy crisis, however, and more specifically the rising cost of conventional fuels, wind energy has become more attractive.

The power available from the wind goes up as the cube of wind velocity, i.e., with double the wind velocity eight times the amount of power is available. In addition, for a given wind velocity, the power which can be extracted by a rotor varies as the square of the diameter, i.e., double the rotor diameter and four times the power is available. It is thus evident that one of the most critical components of a wind turbine is the rotor system and the economic and operational success of a wind turbine is directly linked to the overall efficiency of such rotor system. Unless the maximum power is extracted from the wind by the rotor, the entire system may not have economic viability. Consequently, aerodynamic efficiency, structural capability and reliability, enforceable control in varying wind speeds, low initial cost and long life must be inherent in its basic design.

Since, as stated above, the power which can be extracted varies as the square of the rotor, it is advantageous to increase rotor diameter as much as possible, with present and proposed designs reaching up to 200-300 ft. in diameter. At such large diameters, it is essential that loads on the rotor and the supporting structure be minimized, such as might be caused by variations in wind direction and wind velocity, and that the maximum power be extracted from the rotor at the least expense under such variable wind conditions. While such techniques as the use of yaw drive motors actuating bull gears to correct for wind direction changes and full span pitch control of the blades to correct for wind velocity variations have been reasonably successful for smaller rotor diameter wind turbines, these techniques are too costly and insensitive to be useful on wind turbines having 200-300 ft. rotor diameters.

Accordingly, it is a general object of the present invention to provide an improved wind turbine for the generation of electrical power.

It is another object of the present invention to provide a wind turbine in which fatigue-causing or excessive loads on the rotor and supporting structure can be minimized in a fast and economical manner.

It is a further object of the present invention to provide a wind turbine in which maximum power can be extracted from the wind by the rotor under variable wind conditions.

BRIEF SUMMARY OF THE INVENTION

An improved wind turbine for the generation of electrical power is provided. The tip portions of the blades of the rotor are variable in pitch and are cyclically varied in pitch to control the yaw of the rotor and to relieve bending moments on the blades. The tip portions of the blades of the rotor are also collectively varied in pitch to relieve bending moments on the blades and to maximize the power output of the turbine at a selected constant rotor speed.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF DRAWINGS

FIG. 3 is a schematic illustration of the actuator of FIG. 2;

FIG. 4 is a schematic illustration of a second embodiment of the invention; and

FIG. 5 is a schematic illustration of a third embodiment of the invention.

DETAILED DESCRIPTION OF INVENTION

Figure 1:
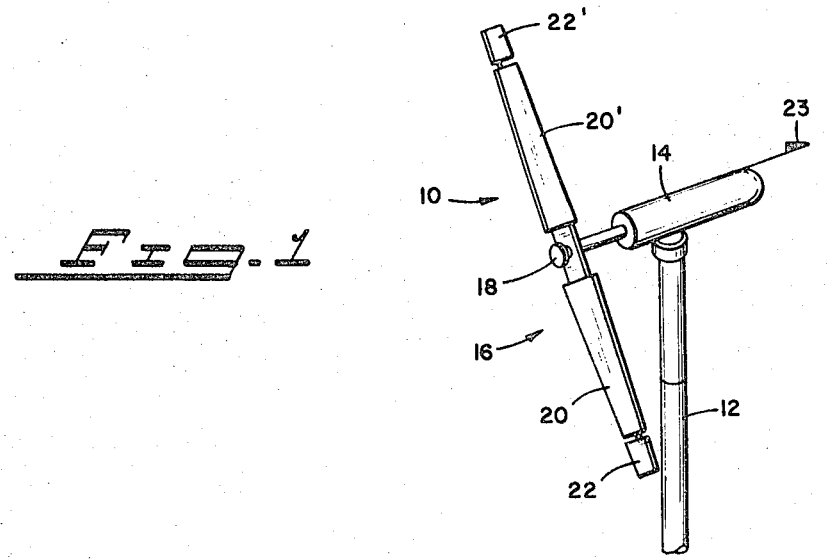
FIG. 1 illustrates a wind turbine suitable for use in the present invention.

Referring now to FIG. 1, a wind turbine 10 is illustrated having a support structure or tower 12, a nacelle 14 supported by the tower 12, and a rotor 16 including a hub 18 partially enclosed and supported by the nacelle 14 and a pair of blades 20, 20' coupled to the hub 18. The blades 20, 20' have tips or tip portions 22, 22' which are variable in pitch with respect to the blades 20, 20' and which are driven by actuators (not shown) to change the pitch as set forth hereinafter. The wind turbine 10 also carries a vane 23 to determine the wind direction and can be driven in the yaw direction by cyclic yaw control of the blades, as described hereinafter, or by a yaw drive (not shown) enclosed within the tower 12 and coupled to the nacelle 14 to keep the rotor 16 facing the wind as indicated by the vane 23.

Figure 2:
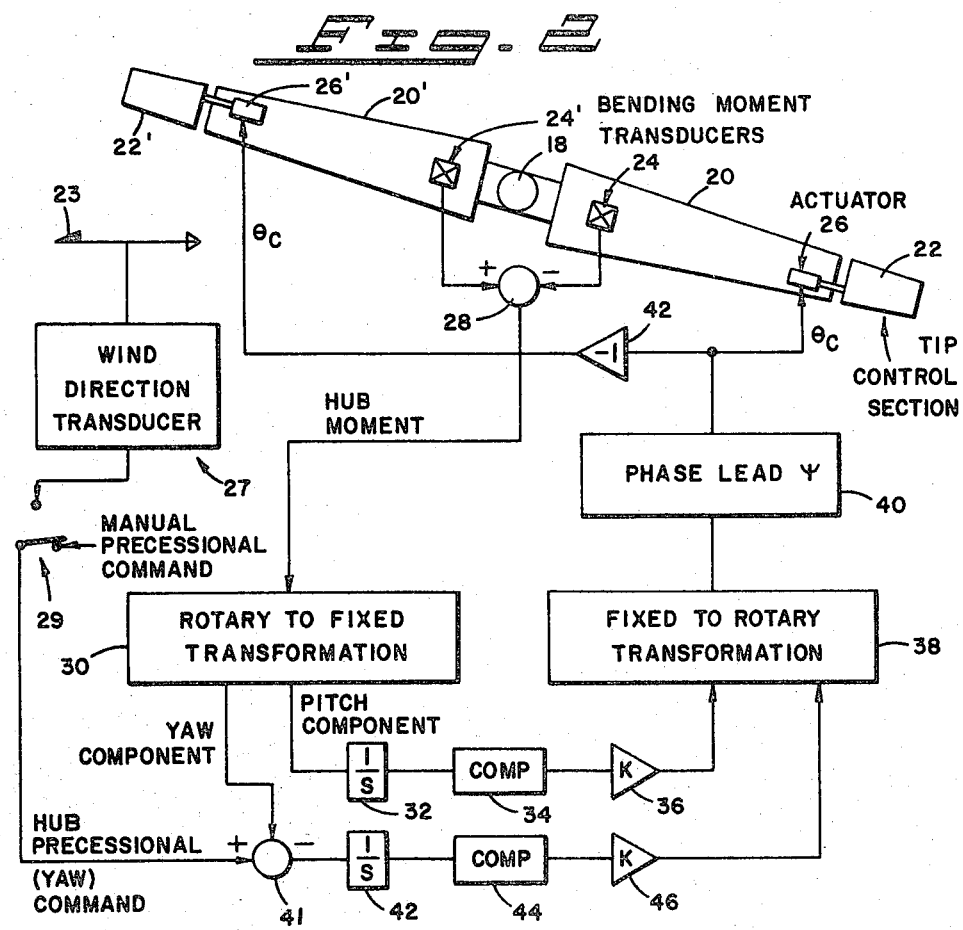
FIG. 2 is a schematic illustration of a first embodiment of the present invention.

As stated previously, variations in wind direction and wind velocity can cause excessive loads, such as bending moments, on the rotor 16 and the tower 12. These loads can be minimized by the cyclic tip control system of the present invention illustrated in FIG. 2. As shown in FIG. 2, a pair of blades 20, 20' having a pair of tips 22, 22' coupled thereto are supported by hub 18. The blades 20, 20' have a pair of bending moment tranducers 24, 24', such as, for example, conventional strain gauges, attached thereto to provide output signals representative of the blade root bending moments on the blades 20, 20' and a pair of actuators 26, 26' contained therein to vary the pitch of the tips 22, 22'. The outputs of the transducers 24, 24' are summed by difference amplifier 28 to determine the net rotor shaft bending moment and the output therefrom is coupled to resolver 30 which transforms the output from amplifier 28 from rotary to fixed coordinates and resolves such output into a yaw (or horizontal) component and a pitch (or vertical) component. The pitch component is integrated in block 32, compensated in block 34, multiplied by a gain factor K in block 36 and coupled into resolver 38. The resolver 30, 38 may be electromechanical or completely electronic in design. The combination of blocks 32, 34 and 36 comprise a type-1 servo control loop, having a forward loop integrator to drive steady state loop errors to zero. The yaw component which acts to try to rotate the rotor 16 and nacelle 14 around the tower axis of rotation is summed with a hub precessional or yaw signal command in differential amplifier 41 and the output therefrom is integrated in block 42, compensated in block 44, multiplied by a gain factor K in block 46 and coupled into resolver 38. As above, the combination of blocks 42, 44 and 46 comprise a type-1 servo control loop, having a forward loop integrator to drive steady state loop errors to zero. The gain factors used in blocks 36 and 46 are chosen to yield a tip control in response to a wind disturbance or command input that is as rapid as possible, without deteriorating damping or stability. The hub precessional or yaw signal command will be zero if the rotor 16 is facing the wind. When the wind direction changes, wind vane transducer 27 coupled to the vane 23 will put out a signal proportional to the angle of the wind relative to the rotor axis of rotation. This signal is applied through switch 29 as a hub precessional (yaw) command which causes the rotor 16 to precess into the wind nulling out the wind vane signal. The rotor 16 may also be manually yawed through switch 29 for checkout or test procedures or if an autorotation start is desired.

Since the blades 20, 20' are rotating, the output of the difference amplifier 28 will be cyclic, in general a sine wave predominantly at the same frequency as that of rotor rotation. Thus, the resolver 38 will also have a cyclic output. The output of the resolver 38 is applied at a phase angle $\Psi$, by box 40, to actuators 26, 26' with the polarity of the output to actuator 26' being reversed by amplifier 42. The signal applied to the actuators 26, 26' is designated as the tip angle command $\theta_c$. The phase angle $\Psi$ is the angle of the rotor azimuth through which a blade travels after a cyclic blade pitch input has been applied before the blade reaches the full flapping angle caused by the input. Thus, the actuators 26, 26' cyclically vary the pitch of the tips 22, 22' in a sinusoidal manner which leads the cyclic bending moments on the blades 20, 20' by the angle $\Psi$, which is equal to or less than 90°. The particular compensation, gain factor K and phase lead angle $\Psi$ given to the signals being applied to the tips 22, 22' will depend on the characteristics of the particular wind turbine. As stated previously, if it is desired to yaw the hub 18, a hub precessional (yaw) command signal is applied to amplifier 41 to cyclically vary the pitch of the tips 22, 22' and thus cause forces on the blades 20, 20' to cause the rotor 16 to precess or yaw around the tower 12. When cyclic (shaft) bending moments are being relieved, a cyclic pitch angle will thus automatically be developed as required for the trim of the tips 22, 22'. This angle is generally nominally small (2°) but may be larger (or smaller) as a function of conditions. The cyclic pitch angle required for a given yaw rate, which may also be combined with bending moment trim, will nominally be 2°–6°, but again this angle is a function of conditions and thus can be larger or smaller.

In FIG. 3, the actuator 26 is schematically illustrated. A DC motor 48 drives tip 22 through a power gear reduction train 50. The angular position and speed of the motor 48 are transduced from a rotary variable differential transformer (RVDT) 52 and a tachometer 54. Signals from the transformer 52 (which measures the tip angle $\theta$) and the tachometer 54 (which transduces tip velocity to damp undesired oscillations) are fed back and summed with the tip angle command signal $\theta_c$ in the servo amplifier 56 which controls the motor 48 to position the tip 22. The transformer 52 is driven by an instrument gear train 58 attached to the rear of the motor 48 and has the same reduction ratio as the power gear reduction train 50 so that the transformer 52 feeds back a position signal which represents the angle $\theta$ of the tip 22. The tip control system illustrated is one of a wide variety of control systems, including hydraulic types, which are suitable for this purpose.

In FIG. 4 a second embodiment of the invention is illustrated. In this embodiment, the tips 22, 22' are collectively varied in pitch to maximize the power output of the wind turbine at a selected constant rotor speed. The rotor speed control can be implemented by a combination of open and closed loop control as illustrated in FIG. 4. Once the rotor 16 has reached the desired speed, an RPM command signal representing such desired speed is inputed into difference amplifier 60 which also receives as its input an electric signal representative of the actual rotation rate of the rotor 16 from a tachometer 62 coupled to the rotor 16. The resultant signal from the amplifier 60 is coupled to block 64 which contains a small deadband circuit and permits the rotor speed to vary within acceptable limits without causing servo action. The output from block 64 is integrated in block 66, compensated in block 68 and multiplied by a gain factor K in block 70 to yield a rotor speed servo command signal $\theta_c''$. The signal $\theta_C$ is added to load and gust command signal $\theta_C'$, as explained hereafter, in summing amplifier 72 to yield tip angle command signal $\theta_C$ which is applied to the tip control system 74 to collectively vary the pitch of the tips 22, 22' to maximize power output. The tip control system 74 is the same as that described in conjunction with FIG. 3. The resultant tip angle $\theta$ causes the tips 22, 22' to aerodynamically interact with the wind and thus alter the RPM of the rotor 16. Factors contributing to such RPM changes involve, for example, inertia, damping, and mechanical and electrical loads. These elements are indicated in block 76 with tip angle $\theta$ being the causal input into block 76 and the RPM, $\Omega$, of the rotor 16 being the output of block 76. As stated previously, tachometer 62 generates an electric signal representative of the rotation rate of the rotor 16 and inputs such signal into amplifier 60. If desired, the RPM command signal can be varied to yield different RPMs, $\Omega_1$ $\Omega_2$, $\Omega_3$, etc.

While the closed loop system alone, i.e. without the load and gust command signal $\theta_C'$ input, will act to maximize power output by maintaining a constant selected rotor speed, an open loop control is provided to further maximize the power output of the wind turbine. Block 78 contains a series of look-up tables calculated in accordance with the characteristics of the particular wind turbine and stored generally in a computer memory corresponding to the desired RPMs, $\Omega_1$, $\Omega_2$, $\Omega_3$, etc. and has as inputs the wind velocity from an anemometer and the electrical load of the grid supplied by the wind turbine and as its output the load and gust command signal $\theta_C'$. Thus, large sudden load (Q) or wind velocity ($V_{wind}$) changes will cause command signal $\theta_C'$ to be generated by block 78 and inputted into summing amplifier 72 to immediately change the tip angle command signal $\theta_c$ and thus the tip angle $\theta$ without waiting for the closed loop system to respond to changes in the rotor speed caused by such load or wind velocity changes. If it is desired, the wind velocity or the load could be monitored and inputted individually.

In FIG. 5, a third embodiment of the present invention is illustrated. In this embodiment, the outputs of the bending moment transducers 24, 24' are summed in amplifier 80 which provides a signal proportional to the collective bending moments experienced by the rotor hub 18. This signal is used to prevent excessive steady state hub loads and oscillatory hub loads. Steady state loads are limited by feeding the collective bending moment signal to an adjustable load limiter 82 which generates an output signal when the signal from the amplifier 80 exceeds a predetermined value. This output signal is coupled through summing junction 84 to the actuators 26, 26' to cause the tips 22, 22' to decrease in pitch when collective bending loads exceeding a preselected magnitude are experienced, thus causing wind to be spilled from the rotor 16. The limiting of such steady state loads also limits the hub torque load which thus controls the load on the hub 18 and also prevents the turbine 10 from coming out of synchronism with the power grid to which it is coupled.

Oscillatory collective loads are damped or suppressed by coupling the signal from amplifier 80 to a bandpass filter 86 which is selected to pass signals corresponding to the particular oscillatory loads desired to be suppressed. In the embodiment shown, a two cycle per revolution (2P) collective moment sensed by the transducers 24, 24' at the root of the blades 20, 20' is illustrated as an example of an oscillatory load to be damped. The bandpass filter 86 passes only signals representing such collective moment having a 2P frequency to a one-cycle sample and hold circuit, represented by box 88, which is coupled to a rotor position sensor 90. The 2P signal is stored digitally by such circuit from a selected reference position (rotor azimuth) of the rotor 18 through a complete 360° revolution of the rotor 18. The stored 2P signal is fed to a wave analyzer 92 which determines the amplitude of the signal and the rotor azimuths at which the maxima of the signal, i.e., the peak collective loads occur. The amplitude and azimuth information is fed to a control signal synthesizer 94 which synthesizes one-cycle of a 2P sinusoidally varying control signal having an amplitude and phase lead angle sufficient to suppress the 2P signal from which it was derived. The particular amplitude and phase lead angle given to the control signal will depend on the characteristics of the particular wind turbine, as stated previously with respect to the gain factor K and the phase angle $\Psi$ utilized in the embodiment of FIG. 2. The control signal is applied to the actuators 26, 26' in the rotor cycle subsequent to that in which the 2P signal was sampled from which the control signal was synthesized. Thus, if the 2P signal is obtained during a rotor period from 0° to 360°, then the control signal would be applied in the rotor period from 360° to 720°. If it is desired to be able to eliminate possible long term 2P standoff errors, the control signal from synthesizer 94 can be fed to a summing junction 98 and thus stored in a one-cycle sample and hold circuit, represented by box 96. This control signal is then summed in summing junction 98 with the subsequent control signal, to generate a summed control signal which is then stored in box 96. The next control signal is summed with the summed control signal, and so forth, thus providing an integral control characteristic to the control loop. The gain factors K in synthesizer 94 and sample and hold circuit 96 would be properly adjusted so that the summed control signal would have, as above, an amplitude sufficient to suppress the 2P signal from which it was derived. The system gain, i.e., the amplitude of the synthesized control signal, is generally set low enough to minimize excessive control action during transient disturbances, but high enough to ensure that the 2P oscillatory collective loads are substantially suppressed within several revolutions of the rotor.

The blade pitch control systems of FIGS. 2, 4 and 5 are, in general, all equipped with blade tip travel limit systems that prevent the rotation of a blade tip into a stall region. These systems compute the maximum allowable blade tip travel (pitch) based on turbine speed, wind speed and wind direction relative to the rotor. The combined servo command signals from the cyclic control system, the speed control system, and the collective load control system are then limited to prevent the displacement of a blade tip beyond the computed travel limit.

Having thus described the invention, it is obvious that numerous modifications and departures may be made by those skilled in the art; thus, the invention is to be construed to be limited only by the spirit and scope of the appended claims.

INDUSTRIAL APPLICATION

The wind turbine is useful in the generation of electrical power from wind energy.

I claim:

1. A wind turbine comprising:
  a rotor, said rotor including a plurality of blades, the tip portions of said blades being variable in pitch and adapted to aerodynamically interact with the wind;
  support means for supporting said rotor;
  load measurement means coupled to said blades for measuring the bending moment on said blades and for providing an output signal representative thereof; and
  adjustment means coupled to said load measurement means for varying the pitch of said tip portions in response to said output signal.

2. The turbine of claim 1 wherein said adjustment means cyclically varies the pitch of said tip portions in response to said output signal.

3. The turbine of claim 2 wherein said adjustment means includes means for conditioning the output signal of said load measurement means and for using said conditioned output signal to cyclically vary the pitch on said tips to relieve the bending moments on said blades.

4. The turbine of claim 2 wherein said conditioning means includes means for adjusting the gain and phase angle of said output signal of said load measurement means to relieve the bending moments on said blades.

5. The turbine of claim 4 wherein said adjustment means includes first transformation means for transforming said output signal from rotary to fixed coordinates prior to adjusting the gain thereof and second transformation means for transforming said resolved signal into rotary coordinates before adjusting the phase thereof.

6. The turbine of claim 5 wherein said first transformation means transforms said output signal into yaw and pitch components and further comprising command means coupled to said adjustment means and adapted to supplement said yaw component to control the yaw of said rotor.

7. The wind turbine of claim 1 wherein said adjustment means collectively varies the pitch of said tip portions in response to said output signal.

8. The turbine of claim 7 wherein said adjustment means includes limiter means for producing a control signal to vary the pitch of said tip portions to relieve said bending moments when said output signal exceeds a predetermined value.

9. The turbine of claim 7 wherein said adjustment means includes:
monitoring means for monitoring the azimuthal position of said rotor;
analyzer means coupled to said monitoring means for determining the amplitude of said output signal and the rotor azimuth at which the maximum amplitude of said output signal occurs; and
synthesizer means coupled to said analyzer means for synthesizing a control signal to vary the pitch of said tip portions to relieve said bending moments.

10. The turbine of claim 9 wherein said analyzer means includes means coupled to said monitoring means for storing said output signal for one rotor revolution from a selected azimuthal position.

11. The turbine of claim 9 wherein said adjustment means further includes filter means coupled to said analyzer means and adapted to limit the bandwidth of said output signal.

12. The turbine of claim 10 wherein said synthesizer means receives said signal amplitude and rotor azimuth information from said analyzer means and generates therefrom a control signal having an amplitude and phase lead angle to substantially suppress said output signal.

13. The turbine of claim 9 further comprising means for storing said control signal and for adding said control signal to the subsequent control signal to yield a summed control signal, said summed control signal being then stored and added to the next subsequent control signal.

* * * * *